Jan. 12, 1971  A. L. NASVYTIS  3,554,054
TRANSMISSION
Filed May 21, 1968  4 Sheets-Sheet 1

INVENTOR.
ALGIRDAS L. NASVYTIS

BY  ATTORNEYS

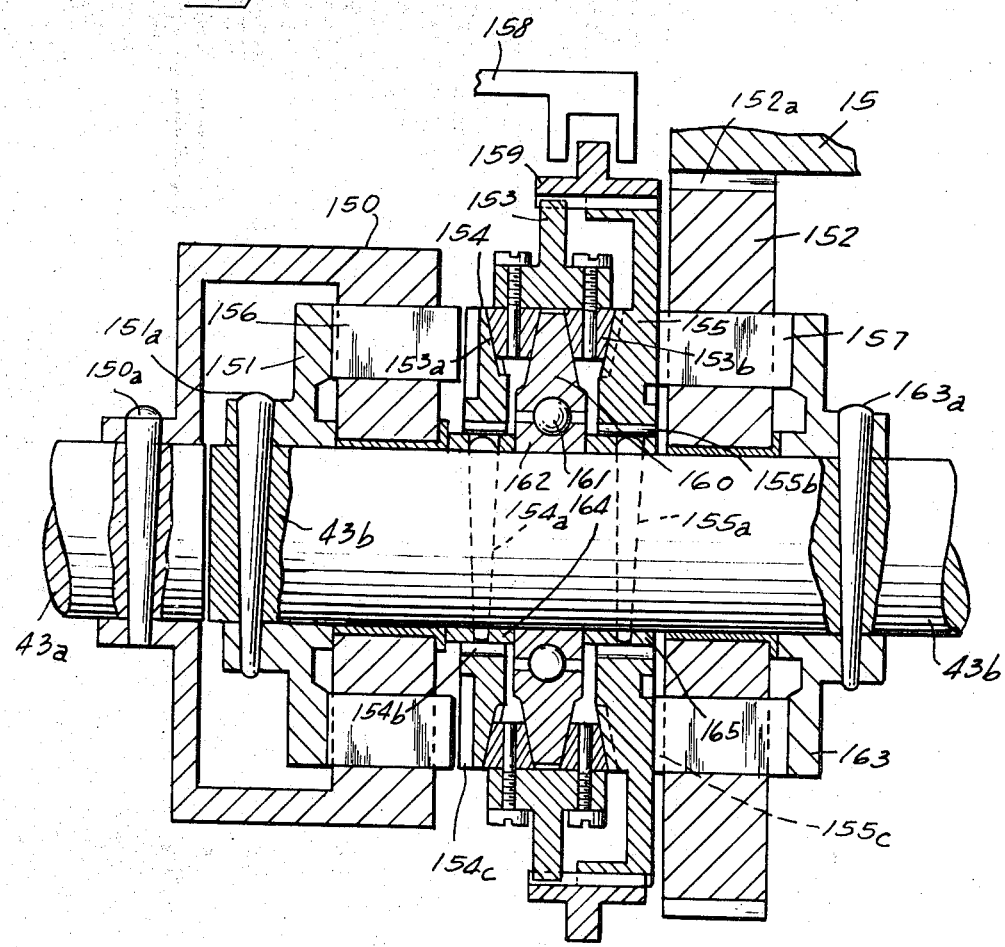

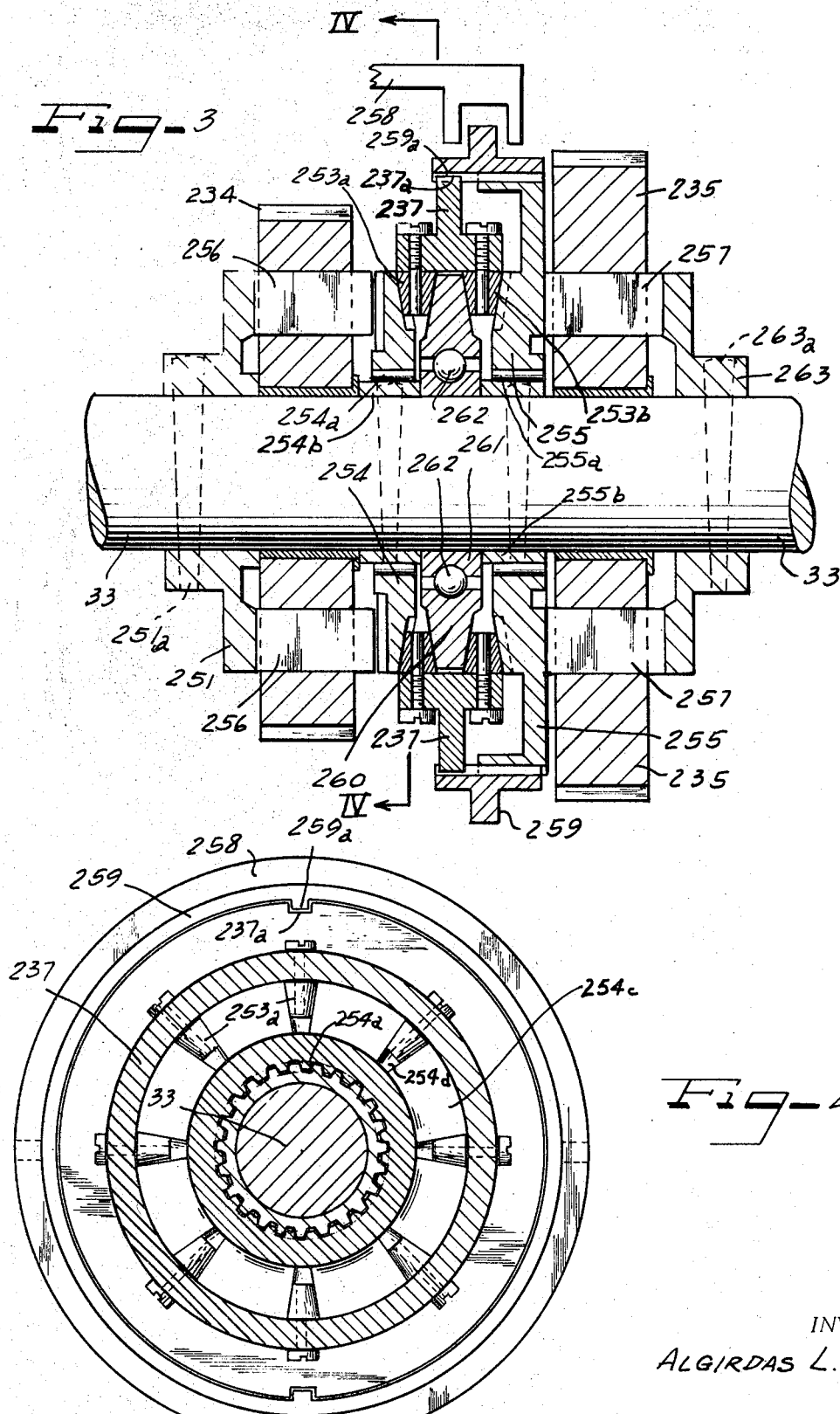

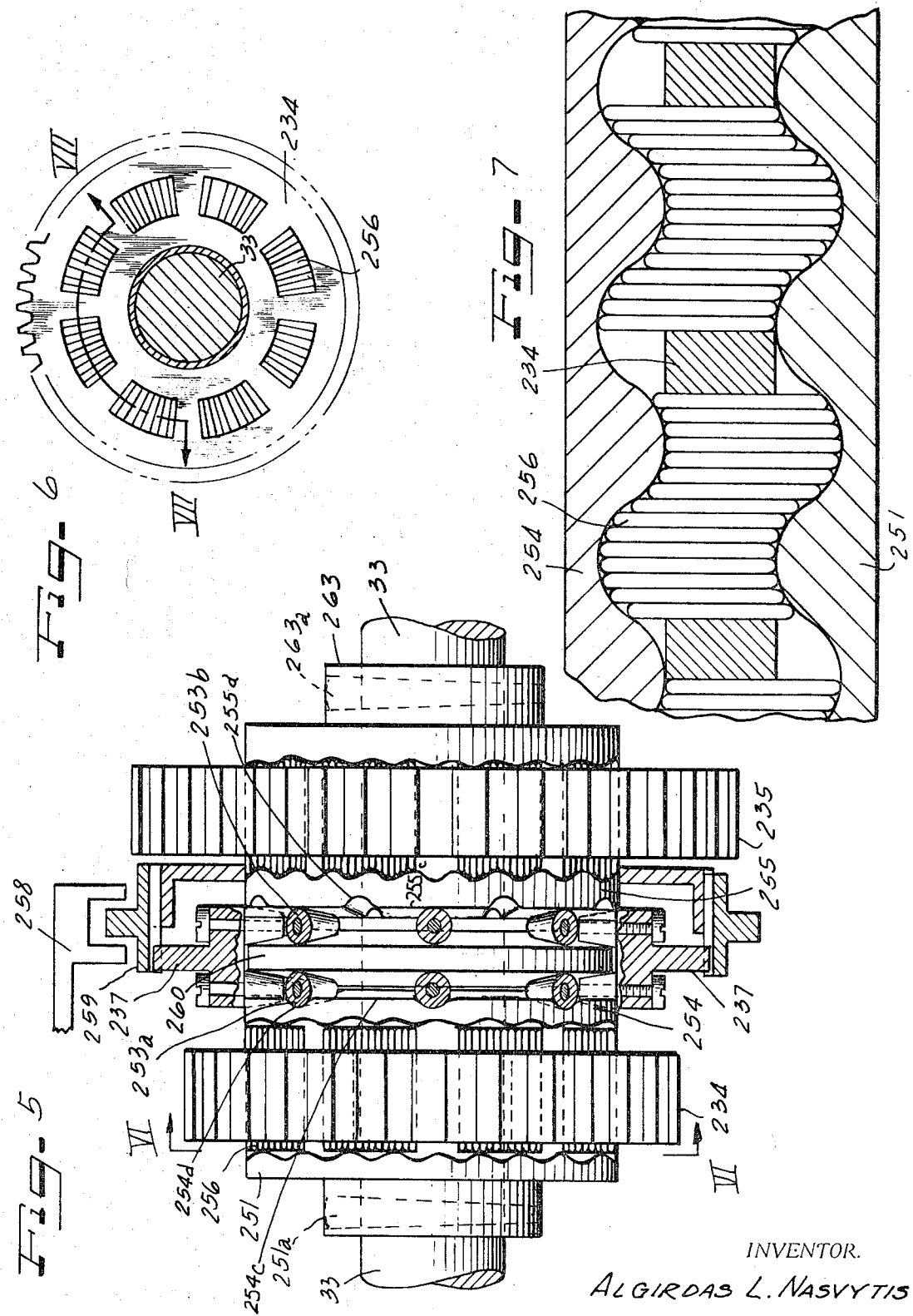

United States Patent Office 3,554,054
Patented Jan. 12, 1971

3,554,054
TRANSMISSION
Algirdas L. Nasvytis, 10823 Magnolia Drive,
Cleveland, Ohio 44106
Filed May 21, 1968, Ser. No. 730,883
Int. Cl. F16d *21/04;* F16h *37/06*
U.S. Cl. 74—682
11 Claims

ABSTRACT OF THE DISCLOSURE

A novel transmission providing shifting capabilities under full loads and additionally providing a transmission-neutral condition without external clutch provision. A novel two-way shiftable clutch is provided for realization of the transmission and accomplishes a face-to-face clutching relationship capable of substantially infinitely variable angular engagement position.

BACKGROUND OF THE INVENTION

As I have described at length in my earlier application, Ser. No. 583,830, filed Oct. 3, 1966, now Pat. No. 3,-468,192, it is desirable to provide a change-speed system having a wide variety of speeds, and to provide such a transmission system with means for varying the gear ratio without at the same time disconnecting the drive for purpose of shifting the mechanical gears. Although a neutral condition was provided in my earlier application, a substantially improved system is provided in accordance with the present invention, wherein a neutral condition is provided from which the automobile or other vehicle may be started, in which shifting of the transmission from any given forward or reverse speed to neutral can be accomplished at any time rather than in a given gear changing sequence.

As in my prior application, the transmission of the present invention provides two power paths between an input shaft and an output shaft. These paths are provided with several change-speed mechanisms and the power paths are comprised of planetary gear systems in constant mesh. As in the prior application, one of the parallel paths may be shifted to provide a change in ratio therein while the other path is transferring torque through the system. Accordingly, by sequentially shifting from power path to power path and the shifting of gears in the stationary power path, a variable ratio transmission is provided capable of providing a continuous torque transmission. In the prior patent application, the technique of providing idling was through an infinite ratio system established by differential or planetary means. This was accomplished by reversing the speed on one countershaft and using the carrier and gear branches of the same gear ratio. A disadvantage of such a system in some vehicle operations is the fact that the car is locked against movement at infinite transmission ratios and, further, the input planetary system will be overloaded under some circumstances if the starting vehicle mets a high resistance starting force. It has been proposed, accordingly, that for some uses, a completely separate clutch should be provided between the transmission and the motor or source of power. However, in accordance with the present invention, such a separate clutch is unnecessary, while at the same time the function of providing a transmission-neutral gear combination is accomplished. In accordance with the present invention, an internal neutral construction is provided by splitting the input planetary ring gear countershaft into two shafts by a disconnect coupling operable between a complete disconnect between the shaft portions and a construction in which the output portion of the shaft is held against rotation. Manifestly, a large number of possible mechanical devices may be employed to accomplish this function. However, in accordance with the present invention, a simplified clutch or brake configuration is preferred and is illustrated. It is, accordingly, an object of the present invention to provide a novel, simple, planetary transmission capable of providing simple change of ratio under full torque and speed and capable of providing an internal neutral condition in which a motor input provides low transmission torque output.

Another object of the present invention is to provide a novel clutch or shifting mechanism capable of use in transmissions or the like.

A feature of the invention resides in the provision of a face-to-face transmission clutch capable of axial torque transmission engagement in a substantially infinite variety of relative angular positions.

Another feature of the invention is the provision of a separable clutch and brake in the input ring and gear countershaft force transmission system.

Still other and further objects and features of the invention will at once become apparent to those skilled in the art from a consideration of the attached drawings and specification.

DESCRIPTION OF THE DRAWINGS

FIG. 2 is a cross-sectional view of a shifting clutch-brake construction employed in the transmission of FIG. 1, and shown in a somewhat enlarged condition;

FIG. 3 is a side-elevational view in cross-section of a modified form of clutch configuration utilized in the tranmission of the present invention;

FIG. 4 is a cross-sectional view taken along the line IV—IV of FIG. 3;

FIG. 5 is a side-elevational view of the clutch configuration shown in FIG. 3;

FIG. 6 is an end-elevational view taken along the line VI—VI of FIG. 5;

FIG. 7 is a partial exploded view in cross-section taken along the line VII—VII of FIG. 6.

DETAILED DESCRIPTION

Figure 1:
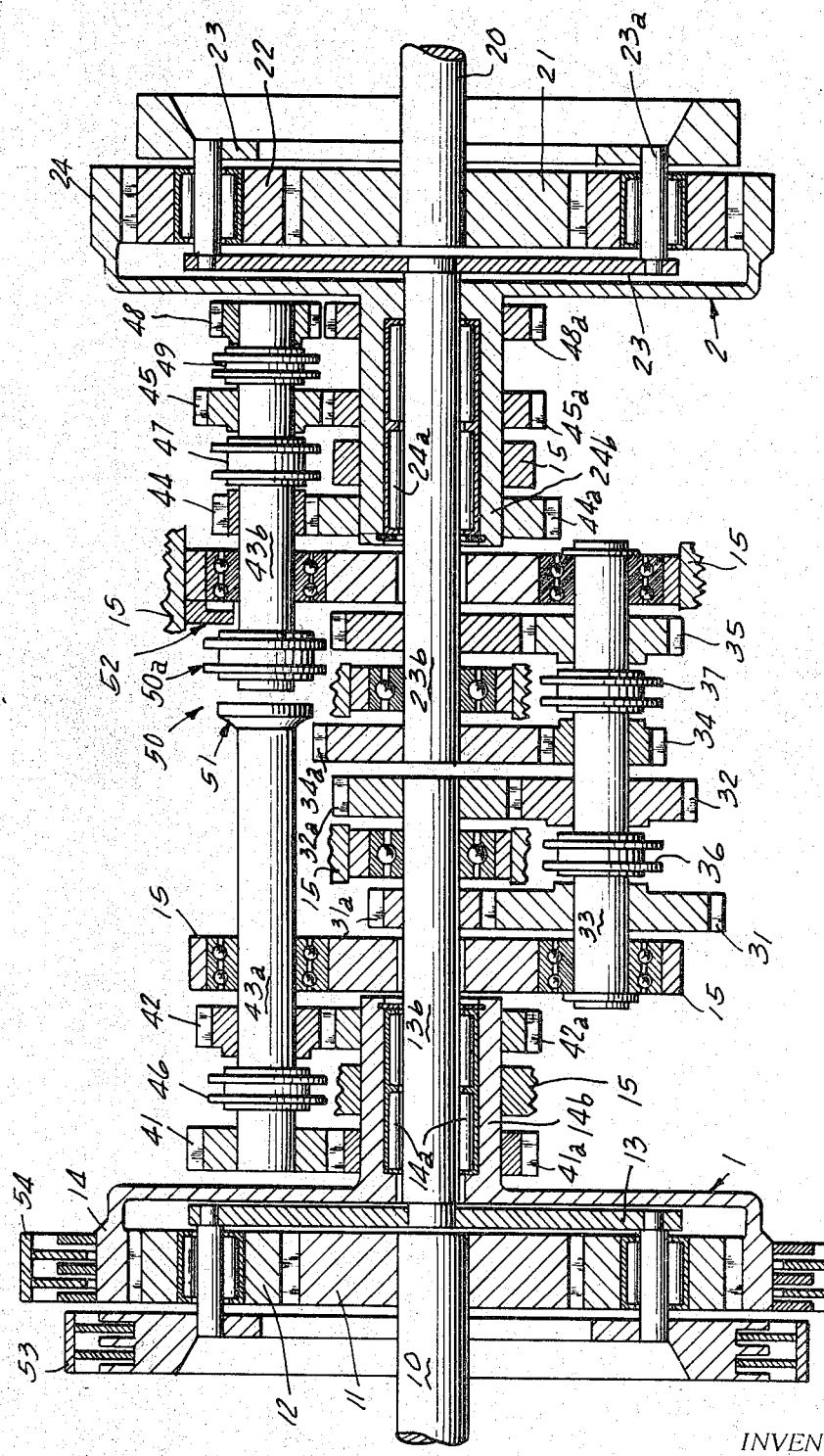
FIG. 1 is a side-elevational view in cross-section of a basic planetary transmission constructed in accordance with a first embodiment of my invention.

As may be seen from a consideration of FIG. 1, the transmission of the present invention, in its basic form, comprises a drive input shaft 10 and an output shaft 20 which comprise, respectively, the shaft for sun members 11 and 21 of input and output planetary systems generally designated 1 and 2. Sun gear 11 cooperates with planets 12 rotatably mounted on carrier 13. Planets 12 cooperate with an internal ring gear 14. Carrier 13 is rotatably carried in fixed housing 15 which supports the transmission by way of a conventional outer closure, not shown. Similarly, ring gear 14 is rotatably carried about the planet shaft 13*b* by means of roller bearings 14*a* which cooperate with the ring gear sleeve extension shaft 14*b*. The basic planetary gear system 2 shown in the drawings is identical to system 1, in reverse. Accordingly, the output shaft 20 carries output sun member 21 with cooperates in turn with planets 22 carried by output carrier 23 via axes 23*a* supported on output carrier shaft 23*b*. Similarly, output ring 24 has its extension sleeve shaft 24*b* supported by bearings 24*a* running on shaft 23*b* rotatably supported in the fixed frame 15.

It will be seen, accordingly, that the transmission provides an input and output planetary transmission having a mirror image relationship. If, for example, the shafts 23 and 13 were directly connected and the shafts 24 and 14 were similarly connected, no ratio change would take place whether or not one or both of the carrier and ring members was fixed or restrained.

However, in accordance with the present system, a wide range of ratio change is accomplished by providing two countershafts 33 and 43 which operate to provide a ratio change, respectively, between shafts 13, 23, and shafts 14, 24. This may readily be seen from FIG. 1 where shaft 33 is rotatably mounted on a fixed frame 15 and carries, rotatably mounted thereon, four gears 31, 32, 34, and 35. Shift collars 36, 37 are splined to the shaft 33 for axial movement thereon, on a selected basis, to cause the engaged gear to shift axially into a condition in which it rotates with the shaft 33. As shown, gears 31 and 32 cooperate, respectively, with gears 31a and 32a fixedly carried by shaft 13b for rotation therewith. Gears 31a and 32a are in constant mesh with their respective gears 31 and 32. Similarly, output gears 34a and 35a are rigidly secured for rotation with shaft 23b and are in constant mesh with their cooperative gears 34, 35. With this arrangement, it will be observed that four different ratios may be provided between carrier 13 and carrier 23 by shifting the clutch yokes or collars 36, 37.

In the same manner as described with respect to the carriers 13, 23, the ring members 14, 24 are interconnected by way of counter shaft 43 through four possible gear ratios. These gear ratios are provided by the counter shaft gear ratios 41, 42, 44, 45 which cooperate, respectively, with gears 41a, 42a, 44a and 45a rigidly secured to the respective input and output ring shafts 14b and 24b. The ratio changes are made by axially shifting yokes 46, 47 which alternately selectively connect one or the other of the gears to the counter shaft 43. A reverse gear is provided by gear 48 carried by counter shaft 43, which gear has an idler gear in contact therewith and in contact with reverse gear 48a carried by shaft extension 24b.

Shifting the transmission is accomplished by shifting yokes 36, 37, 46, 47 and 49, and by braking the rotation of the carrier 13 and/or ring member 14. The latter braking operation is accomplished by means of respective brakes 53, 54 diagrammatically illustrated as multiple disk brakes and energizable in any conventional power or manual manner. For example, the brakes 53 and 54 may be energized by means of a hydraulic piston or electrical solenoid, and similarly, the shift yokes or collars 36, 37, 46, 47 and 49 may axially be shifted by means of such devices energized by manual valve or switch means energizable separately or in combination in accordance with the shifting chart fully disclosed in my earlier patent application Ser. No. 583,830 filed Oct. 3, 1966 and above identified.

As fully described in my copending application, the shifting is accomplished during a condition in which the shaft upon which the shifting clutch is being moved, is stationary. Accordingly, no synchro-mesh devices of any sort are required and, further, the drive need not be interrupted insofar as torque transmission is concerned. It will be observed, that neutral is provided in the transmission gearing combination of the transmission as illustrated, under the circumstances in which the ring gear brake 54 is released and the carrier brake 53 is released and while the gears 31 and 34 are in engagement on the countershaft 33 and while the gears 48 and 42 are in engagement on the shaft 43a–43b when such shaft is in a solid form. Under such circumstances, the transmission shafts are operating in a differential manner and the output is in a balanced stationary condition. In accordance with the present invention, a superior neutral condition is provided through provision for disconnecting shaft portions 43a and 43b as hereinafter provided.

As can be seen from a consideration of FIG. 1, an axially shiftable clutch member generally designated at 50 is provided on the shaft 43a, 43b. Axial movement of a shift collar 50a toward the left as viewed in FIG. 1 will cause a connection of shaft 43a to the shaft 43b, in which circumstances the transmission operates identically as described in my earlier copending application. Upon shifting of the shift collar toward the right as viewed in FIG. 1, shaft 43a is disconnected from shaft 43b and shaft 43b is locked to a braking surface 52 rigid with the housing 15. If the ring gear shift collar 46 is in a neutral or release condition and the carrier clutch or shift collar 36 is engaged in one of its paths, the input rotation will pass through the ring gear, through one of the pairs of gears from the ring gear to the countershaft 43a, and if the shift collar 50 is disengaged, the disconnecting shaft 43a and 43b, the countershaft 43a will rotate freely. When in this condition, the other part 43b of the countershaft is braked and the shifting between gears on the countershaft 43b can be accomplished.

The engagement of the ring gear brake 54, and the disengagement of the carrier brake 53 will start the vehicle in the same manner as a standard clutch. It will be observed that the vehicle can be moved freely if both brakes 53 and 54 are disengaged. Then, the vehicle output wheels, (shaft 20) will supply rotation to the carrier 13 of the first planetary system 1 and will accelerate or decelerate the freely rotating ring 14, disregarding the rotational input of the sun gear 10. This means that the vehicle engine can be at a standstill with the same independent effect. If the carrier brake 53 is engaged, and brake 52 is engaged, both branches from the output shaft 20 to the first planetary system 1 are blocked and the vehicle is locked. The disengagement of the idler shift collar 50 eliminates the reaction force advantages on the first planetary, the brake engagement of which will start movement of the vehicle, thus absorbing all reaction torque. Consequently, this brake 54 must be made relatively strong. As soon as both transmission branches are engaged in ratios, the reaction torque will be diminished and the second brake 53 can, accordingly, be made smaller as it will never be operated at full torque. This extra shift collar 50 allows the multiple speed transmission to switch from any speed of the rotating carrier branch 13 to neutral, assuming that the decelerating vehicle does not put high loads on the transmission. This means that only one shifting is necessary to go to neutral from any speed as compared with the transmission of my earlier application. Since any shift collar configuration for the next start-up condition can be conveniently arranged when the vehicle is at a stand-still condition, the transmission need not pass through all the increasing gears with a vehicle start.

The shifting mechanism 50 may take any conventional form. However, in accordance with the present invention, it is preferred that the clutch be shiftable when the shafts 43a and 43b are both stationary, which condition makes desirable a face-to-face clutching relationship operable at substantially infinitely variable angular clutch face relationship. A novel clutch for accomplishing this may clearly be seen from a consideration of FIG. 2. There, shaft 43a carries an annular member 150 secured axially and peripherally rigidly thereto by means of a transverse pin 150a. Shaft 43b, axially rigidly positioned, carries reaction plates 151 and 163 secured thereto by means of pins 151a and 163a, respectively. A thrust ring 160 is rotatably carried on a race 162 via ball bearings 161. The race 162 is axially rigidly secured relative to the shaft 43b by way of sleeves 164, 165 secured to the shaft 43b by way of pins 154a and 155a respectively and supporting respectively splines 154b and 155b permitting axial sliding of annular engaging members 154 and 155 relative to sleeves 164, 165. Annular engaging members 154 and 155 are axially shiftable by way of a shifting actuator 153 carrying rollers 153a and 153b peripherally rigidly thereon. The axially outward facing surfaces of the engaging members 154, 155 are corrugated, as at 154c, 155c to cooperate with similar corrugated surfaces on the reaction members 151 and 163. Accordingly, if member 154 is moved axially toward the left, by shift actuating member 153, a plurality of thin slidable members 156 will assume a corrugated relationship imposed by the matching faces of 151 and 154 thereby locking member 150, which is pinned to shaft 43a by pin 150a, to reaction plate 151 thereby locking shafts 43a and 43b together. Similarly, if shift actuator 153 moves toward the right, carrying with it engaging plate 155, the thin plates 157 adapt to the corresponding corrugated faces of the engaging member 155 and reaction plate 163 to lock rotation relative to the frame 15, as at 152a. The shaft 43b is, under such circumstances, locked to the housing 15.

It will be noted that the corrugated, or wave-form parts 151 and 154 correspond to each other and cooperate to provide a continuously constant axial distance between corresponding points on the opposed surfaces. The parts 151 and 154 are, as above noted, angularly peripherally fixed relative to each other so that the plates or bars 156, which are of uniform axial length, will slidably adapt to cooperate with the corrugated surfaces independently of the angular position of the annular member carrying the slidable bars. Accordingly, axial movement of the plates 151 and 154 together will cause the annular member 150 to be rigidly fixed to the shaft 43b at substantially precisely the angular position assumed by the shafts 43a, 43b when the movement of the members 151 and 154 occurs. This permits the necessary clutch engagement when the shafts 43a and 43b are both stationary but are in any of an infinite possible number of angular face-to-face relationships.

The face-to-face mechanism 50 provides, as above described, a clutch or brake connect—disconnect combination. Manifestly, however, the desirable features of face-to-face clutching without regard to prior angular alignment between clutched members has a large number of possible utilizations. Such a mechanism may readily be employed in substantially any clutching configuration and is particularly well suited to a clutch structure such as provided between the gears 34 and 35 at the shifting mechanism 37. An arrangement embodying the novel clutch configuration as applied to gear members such as 34 and 35 is more fully detailed in FIGS. 3 through 7 where such a device is fully illustrated.

As shown in FIGS. 3 through 7, the shaft 33 carries rigidly secured thereto reaction plates 251 and 263. A reaction ring 260 is rotatably carried on rings 261 via ball bearings 262 and the race 261 is axially fixed relative to the shaft 33 by the sleeves 254b, 255b, respectively pinned to the shaft 33. The members 254 and 255 are splined to the members 254b, 255b, as at 254a, 255a. As a result, the members 251 and 254, as well as members 255 and 263 rotate together at all times in a constant angular relationship. The annular gear members 234 and 235 rotate freely on the shaft 33 by way of any conventional bearings and carry in slots formed therein, a plurality of thin bars 256, 257 corresponding to the bars 156, and 157 described above relative to the construction shown in FIG. 2.

Axial movement of the slidable members 254, 255 is accomplished by means of the rollers 253a, 253b respectively, which cooperate with the ring 260. In the embodiment shown, one or the other of the members 234, 235 is, at any given time, engaged. For example, in the embodiment illustrated, the gear 235 is shown in the engaged condition with the bars 257 in the corrugated pattern. With the parts in the engaged condition, the rollers 253b are shown as riding on the surface 255c between spaced, curved, recesses 255d. Since the ring 260 is axially fixed, movement of the rollers 253b onto the high ramp area 255c causes axial movement of the member 255 toward the right providing engagement of the clutch. At the same time, the rollers 253a carried by the ring 237 move into the recesses 254d releasing the bars 256, and, accordingly, releasing the gear 234 for rotation relative to the members 251, 254. Oscillatory movement of the actuator 237 through the small angular degree of rotation necessary to move the rollers from the ramp to the grooved area is accomplished by means of a reciprocal actuator 258 which reciprocally moves the rotating member 259. The members 237 and 259 are provided with a pair of axial splines 237a, 259a, respectively, limiting movement of ring 237 to rotational movement with ring 259 but permitting axial sliding relative thereto. Ring 259 is splined to annular member 255 by angle splines so that when member 259 reciprocates upon movement by actuator 258, the annular member 255 is forced to oscillate the amount necessary to permit movement of rollers 253b into the grooves 255d. Since members 254 and 255 are axially splined for rotation simultaneously together, movement of member 255 will cause similar movement of member 254 requiring the rollers 253a to move on to the ramp area 254c simultaneously with movement of the rollers 253b into the grooves 255d.

In the embodiment of the clutch shown in FIG. 5, it is desired that the gears 234 and 235 be alternately operable at any given moment. However, engagement of the gears 234 and 235 can be provided for separately, if desired, by providing a pair of axially spaced rings 260 with separate actuators 237 for each of the clutch engaging annular members 254, 255, each separate member 237 being manually operable by a separate actuator. It will, accordingly, be seen that the face-to-face clutch system of the present invention may be employed in a myriad number of differing installations, although it has important functional advantages in the transmission combination shown in the present application. It will be further apparent that the face-to-face clutch and brake combination 50 shown in FIG. 1 may readily be employed in exactly the same configuration in the transmission shown in Fig. 2 of my prior copending application, Ser. No. 583,830 to provide a superior neutral transmission condition. Still other variations will at once be apparent to those skilled in the art, and may be made without departing from the novel concepts of my present invention. It is, accordingly, my intent that the scope of the present invention be limited solely by that of the hereinafter appended claims.

I claim:

1. In combination in a transmission, a planetary input system, comprising a first drive input sun gear member, first planet carrier means carrying a first set of planet gear members and a first ring gear member, a planetary output system comprising a second drive output sun gear member, second planet carrier means carrying a second set of planet gear members and a second ring gear member, connection means drivingly connecting said first and second planet carrier means, second connection means drivingly connecting said first and second ring gear members, and clutch means selectively engaging said second connection means or disconnecting said second connection means and stopping rotation of said second ring member.

2. The transmission of claim 1 wherein said clutch means comprises means engageable substantially independently of the angular relationship of the two disconnected parts of said second connection means.

3. The transmission of claim 2 wherein said clutch means comprises axial face-to-face engaging surfaces.

4. A mechanism for selectively connecting a member to alternate members comprising a shaft member, an annular thrust ring coaxial therewith and fixed against axial movement relative thereto, first and second annular members rotatably positioned on axially opposite sides of said ring, first and second annular reaction plates coaxial with said shaft and rotatably and axially fixed relative thereto, first and second annular engaging members on opposite sides of said ring and positioned between said ring and a respective annular member for axial but not angular movement relative to said shaft, actuator means carried on said ring for selectively axially moving one of said engaging members toward its respective annular member and reaction plate, and axially overlapping means responsive to said last named movement to lock positively the respective annular member to its reaction plate without regard to the instantaneous angular relationship between the plate and its respective annular member.

5. The mechanism recited in claim 4 wherein movement of said actuator means to move one of said engaging members toward its respective reaction plate simultaneously releases the other of said engaging members to unlock the other annular member relative to its respective reaction plate.

6. The clutch construction set forth in claim 4 wherein said last named means comprises a plurality of rigid bars axially slidable in each said annular member but peripherally fixed therein, said respective annular engaging member and reaction plate having complementary corrugated facing surfaces, and means locking the respective reaction plate and engaging member in axially fixed condition when said actuator means moves an engaging member toward its respective annular member.

7. The mechanism in claim 4 wherein said plates are each rigid with said shaft and said annular members are alternately secured to said shaft by shifting said actuator means.

8. The mechanism set forth in claim 4 wherein one of said annular members is secured against rotation at all times.

9. The mechanism set forth in claim 5 wherein said last named means comprises a plurality of rigid bars axially slidable in each said annular member but peripherally fixed therein and means interlocking said bars to the respective reaction plate and engaging member when said actuator means moves an engaging member toward its respective driven member.

10. A drive connection mechanism for selectively connecting a member to one of the other of selected outputs, comprising a shaft member, an annular thrust ring thereon fixed against axial movement thereon, first and second annular output members on opposite sides of said ring, first and second annular reaction plates axially and angularly fixed relative to said shaft member, first and second annular engaging members positioned between said ring and the respective output member and axially slidable on said shaft, actuator means rotatable on said ring for selectively axially moving one of said engaging members and forcing it toward its respective reaction plate, and axially meshing means responsive to said last named movement to lock positively the respective output to its reaction plate without regard to the instantaneous angular relationship between the output member and the reaction plate.

11. The transmission of claim 2 wherein said clutch means comprises axial face-to-face interengaging surfaces providing a positively locking drive when engaged.

References Cited

UNITED STATES PATENTS

| | | | |
|---|---|---|---|
| 815,168 | 3/1906 | Hoehne et al. | 192—107 |
| 2,008,873 | 7/1935 | Nydegger | 192—18 |
| 2,392,984 | 1/1946 | Gerst | 192—70.23X |
| 2,416,083 | 2/1947 | Battaline | 192—67 |
| 3,105,582 | 10/1963 | Ziabicki | 192—48.91X |
| 3,334,527 | 8/1967 | Carnegie | 74—682X |
| 3,386,545 | 6/1968 | Hansen | 192—18 |

FOREIGN PATENTS

| | | | |
|---|---|---|---|
| 876,416 | 8/1942 | France | 74—640 |
| 557,569 | 11/1943 | Great Britain | 192—70.19 |

MARK NEWMAN, Primary Examiner

T. C. PERRY, Assistant Examiner

U.S. Cl. X.R.

192—18, 48.91, 67, 93, 108